March 11, 1941.  R. W. GEORGE  2,234,556
HIGH FREQUENCY COUPLING SYSTEM
Filed Aug. 31, 1939
*Fig. 1*
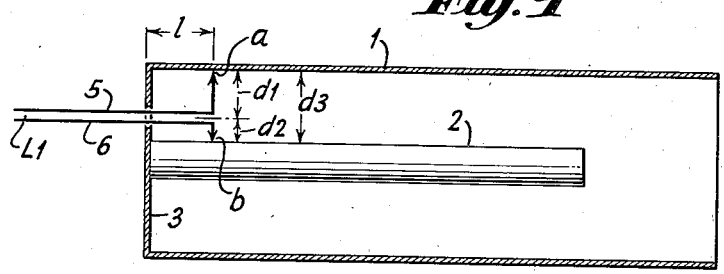
*Fig. 2*
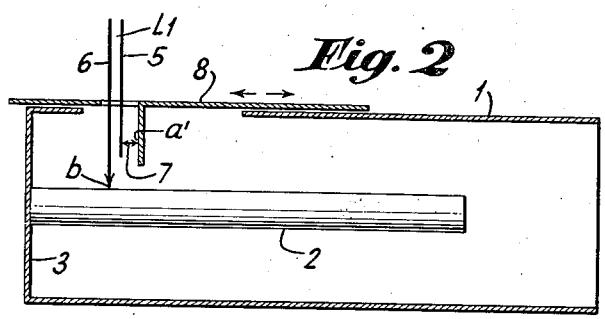
*Fig. 3*
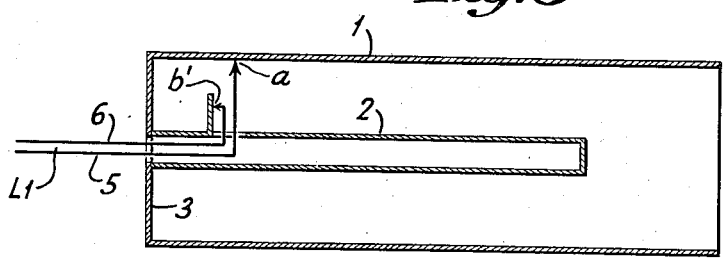
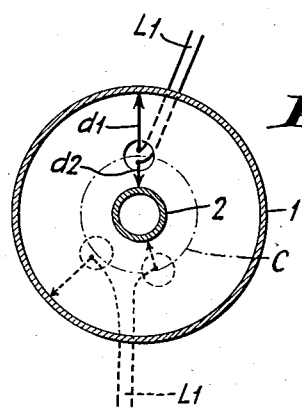
*Fig. 4*
INVENTOR.
RALPH W. GEORGE
BY
ATTORNEY.

Patented Mar. 11, 1941

2,234,556

UNITED STATES PATENT OFFICE 2,234,556

HIGH FREQUENCY COUPLING SYSTEM

Ralph W. George, Riverhead, N. Y., assignor to Radio Corporation of America, a corporation of Delaware Application August 31, 1939, Serial No. 292,770

9 Claims. (Cl. 178—44)

This invention relates to signalling systems operating at radio frequencies, and more particularly to arrangements for coupling an unbalanced or grounded circuit, such as a coaxial line, to a balanced circuit, such as a two-wire feeder or transmission line, without disturbing the balance of the latter.

An object of the present invention is to couple two sides of an electrical circuit which are in balanced relation with respect to ground to a section of coaxial line which is not electrically balanced with respect to ground, without disturbing the balance of the balanced circuit.

Another object is to couple a two-wire feeder or transmission line to a concentric line resonator such that the characteristic impedance of the two-wire feeder is matched by the coupled impedance of the concentric line resonator.

A further object is to so couple a balanced electrical circuit to a single concentric resonant line for use at ultra high radio frequencies that the following requirements are satisfied: (1) The balance to ground of the two sides of the balanced circuit is maintained; (2) there is a minimum loss in coupling between the two coupled circuits, as compared to the conventional coil coupling through an electrostatic shield; and (3) for an optimum coupling adjustment over a wide frequency range the foregoing factors (1) and (2) are substantially unchanged.

Although the present invention is described with particular reference to a coaxial or single concentric line resonator, it should be understood that the principles are not limited thereto but are applicable wherever a balanced two-conductor feeder is to be coupled to a concentric line.

In accordance with the invention, it is proposed to obtain a balanced termination for the two sides of the two-wire feeder by making each side of the line couple with the same amount of flux in the concentric line, with the result that each side of the balanced circuit sees the same impedance reflected from the concentric line. Instead of employing a coil or loop of wire to obtain electromagnetic coupling between the balanced two-wire line and the concentric line, as heretofore proposed, the electromagnetic coupling is obtained by directly connecting the two wires of the balanced circuit to the inner surface of the outer conductor and the outer surface of the inner conductor of the concentric line in the manner described in more detail hereinafter. The value of the terminating impedance for the two-wire line is determined by the degree of coupling, and in the case of a resonant concentric line also by the resonant impedance of the concentric line, it being understood that the impedance on a resonant concentric line is a function of the voltage and current distribution.

It should be understood, of course, that in order to match the impedance of the balanced two-wire feeder or transmission line to the concentric line, in the manner indicated above, the characteristic impedance of the balanced circuit must be not greater than the maximum impedance that can be obtained from the concentric line. For example, if it is desired to match a 200 ohm balanced line to a concentric line having a characteristic impedance of 100 ohms, it would be necessary to employ some form of impedance transformer between the two coupled circuits.

In accordance with one embodiment of the invention, both wires of the two-wire line enter the space between the conductors of the concentric line resonator through the end plate which connects the inner and outer conductors of the resonator together. According to another embodiment, the wires of the balanced circuit enter the space between the conductors of the concentric line through an aperture in the outer conductor. According to a further embodiment, the wires of the balanced circuit enter the space between the conductors of the concentric line through an aperture in the inner conductor.

Other objects and features and their advantages will appear from a reading of the following description, which is accompanied by a drawing wherein like parts are represented by like reference numerals through the figures.

In the drawing:

Figs. 1, 2 and 3 show three different embodiments of the invention, given by way of example only, showing preferred arrangements for coupling a two-wire line balanced with respect to ground to a section of coaxial line; and Fig. 4 is a cross-section of a coaxial line, and illustrates the availability of a range of spacing for the wires of the balanced two-wire line entering the space between the conductors of the coaxial line.

Referring to Fig. 1, there is shown a balanced two-wire feeder circuit $L_1$ having wires 5, 6 coupled to a concentric line resonator 1, 2, the outer conductor of which may be connected to ground. This concentric resonator comprises an outer conductor 1 and an inner conductor 2, both coupled together at one end in suitable manner by an end plate 3. This type of concentric line resonator is well known in the art, reference being made to the article by Clarence W. Hansell entitled "Resonant Lines for Frequency Control," published in "Electrical Engineering," August, 1935, pages 852 et seq., and to United States Patent No. 2,108,895, granted February 28, 1938, to Fred H. Kroger, for a more detailed description of the same. The line $L_1$ is shown entering the space between the conductors 1, 2 of the concentric line through an aperture in the end plate 3, one wire 5 directly connecting to the inner surface of conductors 1 at point $a$, while the other wire 6 connects with the outer surface of conductor 2 at point $b$. Points of connection $a$ and $b$ are so chosen that the impedance presented by the concentric line to both wires 5 and 6 of balanced line $L_1$ is the same. The distance between point $a$ and end plate 3 is preferably made equal to the distance between point $b$ and end plate 3. Each wire of line $L_1$ forms a loop with the resonant line which electromagnetically couples with a certain amount of flux existing between the conductors of the resonant line. These loops include those portions of the conductors of the concentric line which they contact, as measured from the end plate 3 to points $a$ and $b$. Wires 5 and 6 of balanced line $L_1$ are so spaced from the conductors 1 and 2 that the loops formed by these wires with the conductors of the concentric line couple with the same amount of flux within the resonator, so as to provide a balanced termination for the line $L_1$. The lengths of the two coupling loops will be the same if the point of entry of the two-wire line $L_1$ to the concentric line is chosen according to the predictable flux distribution around the inner conductor 2 of the concentric line. It follows that because the flux density is greater nearer the inner conductor of the line than near the outer conductor the distance $d_1$ will be greater than $d_2$, in order to obtain the same amount of flux in each loop. A preferred arrangement is to have $d_1+d_2=d_3$, approximately. No inductive coupling is had to the concentric line 1, 2 for voltages existing against ground on the wires 5, 6 of two-wire line $L_1$ because such voltages produce currents in opposite directions in the two coupling loops, thus balancing each other.

Up to the point where the wires 5 and 6 of line $L_1$ diverge to connect to points $a$ and $b$ on the outer and inner conductors 1, 2 of the concentric line, some small voltage to ground may exist, for example, in cases where the two-wire line $L_1$ acts as a vertical antenna. This voltage to ground may couple with the concentric line by capacity but this coupling will be small because of the favorable location of the coupling loops at the low voltage end of the concentric line, inasmuch as the potential on line $L_1$ with respect to ground decreases as the wires 5 and 6 progress into the concentric resonator. It is believed that this capacity coupling is further reduced because the two-wire line as it enters the concentric line will have nearly equal capacities to the inner and outer conductors 1, 2, respectively, thus producing nearly equal currents in these conductors which tend to balance each other. In the event the proportions of the coupling loops are not chosen in the optimum manner, with the result that appreciable unbalanced capacity coupling exists, it will be apparent that this can be compensated for by slightly unbalancing the inductive coupling; i. e., by making one coupling loop link slightly more or less flux than the other coupling loop. In practice, it is believed that the necessary unbalance to obtain this compensation would be negligible.

Fig. 2 illustrates an arrangement wherein the balanced line $L_1$ enters the concentric line through an aperture in the outer conductor 1. This aperture is covered for the most part by a shield 8 which contacts the outer conductor 1 and is movable over the length of the concentric line in order to permit adjustment of the tapping point $b$ on the inner conductor. Wire 5 of line $L_1$ is adjustably connected to the inner surface of conductor 1 by means of slider 7 which slidably engages at $a'$, an inwardly projecting flange on shield 8, as shown. Slider 7 permits a variation to be made in the amount of flux which couples to each side of the two-wire line $L_1$, thus enabling a balance to be obtained between wires 5 and 6.

Fig. 3 illustrates another arrangement of the invention wherein the balanced line $L_1$ enters the concentric line through the interior of the hollow inner conductor 2. An aperture is provided in the inner conductor to permit the wires 5 and 6 to enter the space between the conductors of the concentric line. An inwardly projecting flange on the inner conductor 2 permits the wire 6 to be adjustably tapped at $b'$ over the length thereof to obtain a variation in the amount of flux which couples to each side of the two-wire line $L_1$, thus providing a balance between wires 5 and 6.

Fig. 4 shows a cross-section of the concentric line resonator 1, 2 and indicates how the balanced line $L_1$ can be connected to the conductors of the concentric line at different locations. The dash line C is a concentric circle representing a coaxial cylindrical zone in which it is preferred to enter the two-wire line $L_1$. It will be apparent that each of the two wires of line $L_1$ can be placed anywhere in this zone, thus making available a range of spacing for the balanced line.

What is claimed is:

1. In a high frequency system, a circuit balanced to ground, a coaxial line having an inner conductor and an outer conductor coupled together at one end, a connection from one side of said balanced circuit to the inner surface of the outer conductor of said coaxial line, and a connection from the other side of said balanced circuit to the outer surface of the inner conductor of said coaxial line, the points of connection between the conductors of said coaxial line and said balanced circuit being such that each side of said balanced circuit is terminated with the same impedance by said coaxial line, both sides of said balanced circuit entering the space between the conductors of said coaxial line in proximity to each other.

2. In a high frequency system, a circuit balanced to ground, a coaxial line having an inner conductor and an outer conductor coupled together at one end, a connection from one side of said balanced circuit to the inner surface of the outer conductor of said coaxial line, and a connection from the other side of said balanced circuit to the outer surface of the inner conductor of said coaxial line, the points of connection between the conductor of said coaxial line and said balanced circuit being such that each side of said balanced circuit is terminated with the same impedance by said coaxial line, both sides of said balanced circuit entering the space between the conductors of said coaxial line through a single aperture in said coaxial line.

3. In a high frequency system, a circuit balanced to ground, a coaxial line having an inner conductor and an outer conductor coupled together at one end, a connection from one side of said balanced circuit to the inner surface of the outer conductor of said coaxial line, and a connection from the other side of said balanced circuit to the outer surface of the inner conductor of said coaxial line, the points of connection between the conductor of said coaxial line and said balanced circuit being such that each side of said balanced circuit is terminated with the same impedance by said coaxial line, both sides of said balanced circuit entering the space between the conductors of said coaxial line through a single aperture in said outer conductor.

4. In a high frequency system, a circuit balanced to ground, a coaxial line having an inner conductor and an outer conductor coupled together at one end, a connection from one side of said balanced circuit to the inner surface of the outer conductor of said coaxial line, and a connection from the other side of said balanced circuit to the outer surface of the inner conductor of said coaxial line, the points of connection between the conductors of said coaxial line and said balanced circuit being such that each side of said balanced circuit is terminated with the same impedance by said coaxial line, both sides of said balanced circuit entering the space between the conductors of said coaxial line through a single aperture in said inner conductor.

5. In a high frequency system, a circuit balanced to ground, a coaxial line having an inner conductor and an outer conductor connected together at one end, a connection from one side of said balanced circuit to the inner surface of the outer conductor of said coaxial line, and a connection from the other side of said balanced circuit to the outer surface of the inner conductor of said coaxial line, the points of connection between the conductors of said coaxial line and said balanced circuit being such that each side of said balanced circuit is terminated with the same impedance by said coaxial line, both sides of said balanced circuit entering the space between the conductors of said coaxial line in proximity to each other, the distance from the sides of said balanced circuit to said outer conductor being greater than the distance from said balanced circuit to said inner conductor, as measured within said coaxial line.

6. In a high frequency system, a circuit balanced to ground, a coaxial line resonator having an inner conductor and an outer conductor connected together at one end by an end plate, a connection from one side of said balanced circuit to the inner surface of the outer conductor of said coaxial line, and a connection from the other side of said balanced circuit to the outer surface of the inner conductor of said coaxial line, both sides of said balanced circuit entering the space between the conductors of said coaxial line in proximity and parallel to each other, the points of connection between the conductors of said coaxial line and said balanced circuit being substantially equally distant from said end plate, the distance from the parallel sides of said balanced circuit as measured from a point within said coaxial line to said outer conductor being different than the distance from said same point of measurement to said inner conductor.

7. In a high frequency system, a circuit balanced to ground, a coaxial line resonator having an inner conductor and an outer conductor connected together at one end by an end plate, a connection from one side of said balanced circuit to the inner surface of the outer conductor of said coaxial line, and a connection from the other side of said balanced circuit to the outer surface of the inner conductor of said coaxial line, both sides of said balanced circuit entering the space between the conductors of said coaxial line through said end plate and parallel to each other, the points of connection between the conductors of said coaxial line and said balanced circuit being substantially equally distant from said end plate, the distance within said coaxial line from the parallel sides of said balanced circuit to said outer conductor being different than the distance from said same point of measurement to said inner conductor.

8. In a high frequency system, a circuit balanced to ground, a coaxial line resonator having an inner conductor and an outer conductor connected together at one end, a connection from one side of said balanced circuit to the inner surface of the outer conductor of said coaxial line, and a connection from the other side of said balanced circuit to the outer surface of the inner conductor of said coaxial line, both sides of said balanced circuit entering the space between the conductors of said coaxial line through an aperture in said outer conductor, the points of connection between the conductors of said coaxial line and said balanced circuit being substantially equally distant from said connected end, the distance within said coaxial line from the parallel sides of said balanced circuit to said outer conductor being different than the distance from said same point of measurement to said inner conductor.

9. In a high frequency system, a circuit balanced to ground, a coaxial line resonator having an inner conductor and an outer conductor connected together at one end, a connection from one side of said balanced circuit to the inner surface of the outer conductor of said coaxial line, and a connection from the other side of said balanced circuit to the outer surface of the inner conductor of said coaxial line, both sides of said balanced circuit entering the space between the conductors of said coaxial line through an aperture in said inner conductor and parallel to each other, the points of connection between the conductors of said coaxial line and said balanced circuit being substantially equally distant from said connected end, the distance within said coaxial line from the parallel sides of said balanced circuit to said outer conductor being different than the distance from said same point of measurement to said inner conductor.

RALPH W. GEORGE.